United States Patent
Sterman (10) Patent No.: US 9,509,744 B2
(45) Date of Patent: Nov. 29, 2016

(54) SYSTEMS AND METHODS OF ROUTING IP TELEPHONY DATA PACKET COMMUNICATIONS

(71) Applicant: VONAGE BUSINESS INC., Atlanta, GA (US)

(72) Inventor: Baruch Sterman, Efrat (IL)

(73) Assignee: VONAGE BUSINESS INC., Atlanta, GA (US)

( * ) Notice: Subject to any disclaimer, the term of this patent is extended or adjusted under 35 U.S.C. 154(b) by 22 days.

(21) Appl. No.: 13/925,969

(22) Filed: Jun. 25, 2013

(65) Prior Publication Data
US 2014/0376451 A1 Dec. 25, 2014

(51) Int. Cl.
H04L 12/66 (2006.01)
H04L 29/06 (2006.01)
H04L 12/721 (2013.01)

(52) U.S. Cl.
CPC .............. *H04L 65/80* (2013.01); *H04L 45/123* (2013.01); *H04L 45/70* (2013.01); *H04L 65/1083* (2013.01)

(58) Field of Classification Search
CPC combination set(s) only.
See application file for complete search history.

(56) References Cited

U.S. PATENT DOCUMENTS

| | | | |
|---|---|---|---|
| 6,363,065 B1 * | 3/2002 | Thornton et al. | 370/352 |
| 6,512,761 B1 * | 1/2003 | Schuster et al. | 370/352 |
| 6,574,216 B1 * | 6/2003 | Farris et al. | 370/352 |
| 6,748,433 B1 * | 6/2004 | Yaakov | 709/224 |
| 6,934,258 B1 * | 8/2005 | Smith | H04L 12/5692 370/238 |
| 7,995,464 B1 * | 8/2011 | Croak et al. | 370/218 |
| 2009/0080336 A1 * | 3/2009 | Zhang et al. | 370/248 |
| 2010/0027418 A1 * | 2/2010 | Rodrig | H04L 41/147 370/235 |
| 2011/0194421 A1 * | 8/2011 | Rodrig | H04L 41/147 370/248 |
| 2011/0194448 A1 | 8/2011 | Rodrig | |
| 2013/0086267 A1 | 4/2013 | Gelenbe et al. | |

OTHER PUBLICATIONS

Feb. 13, 2015 Office Action issued in U.S. Appl. No. 13/926,021.
Apr. 21, 2016 Office Action issued in U.S. Appl. No. 13/926,021.
Sep. 11, 2015 Office Action issued in U.S. Appl. No. 13/926,021.

* cited by examiner

*Primary Examiner* — Frank Duong
(74) *Attorney, Agent, or Firm* — Nixon & Vanderhye P.C.; Joseph Pagnotta (57) ABSTRACT

Systems and methods for determining quality measures for communication paths that can be used to conduct telephony communications determine and record quality measures for each of a plurality of paths during different times of the day and different days of the week. This information is used to determine and record measures of how the quality of each path varies over predetermined periods of time. When it is necessary to select a path for the setup of a new telephony communication, information regarding the anticipated quality of different potential paths, and information regarding how that quality is expected to vary over the duration of the telephony communication are used to select a path for the telephony communication.

13 Claims, 8 Drawing Sheets

|  | PERIOD 1 | | PERIOD 2 | | PERIOD 3 | | PERIOD 4 | | PERIOD 5 | | PERIOD 6 | | PERIOD 7 | | PERIOD 8 | |
|---|---|---|---|---|---|---|---|---|---|---|---|---|---|---|---|---|
|  | AVE. | VAR. | AVE. | VAR. | AVE. | VAR. | AVE. | VAR. | AVE. | VAR. | AVE. | VAR. | AVE. | VAR. | AVE. | VAR. |
| PATH 1 | 7 | 2 | 8 | 2 | 7 | 2 | 7 | 1 | 7 | 2 | 9 | 1 | 8 | 1 | 7 | 2 |
| PATH 2 | 4 | 2 | 5 | 2 | 5 | 2 | 4 | 1 | 4 | 2 | 4 | 2 | 5 | 2 | 5 | 2 |
| PATH 3 | 8 | 1 | 9 | 1 | 8 | 1 | 8 | 2 | 7 | 2 | 8 | 1 | 9 | 1 | 9 | 2 |
| PATH 4 | 6 | 7 | 2 | 6 | 6 | 2 | 7 | 2 | 8 | 8 | 3 | 7 | 3 | 7 | 7 | 5 |

SYSTEMS AND METHODS OF ROUTING IP TELEPHONY DATA PACKET COMMUNICATIONS

BACKGROUND OF THE INVENTION

The invention is related to Internet Protocol (IP) telephony systems. More specifically, the invention is related to systems and methods for determining how best to route the data packets that carry communications enabled by an IP telephony system.

Existing IP telephony systems allow users to place and receive telephone calls or to send and/or receive other types of communications, such as text messages, SMS messages, MMS messages and the like. The communications are transmitted, at least in part, by data packets that traverse a private and/or public data network.

For example, a calling party can place a telephone call to a called party using an IP telephony device that is coupled to a private or public data network. When the user requests that the call be placed, an IP telephony system receives the request and sets up the call between the calling party's telephony device and the called party's telephony device. The called party's telephony device can also be an IP telephony device that is coupled to a private or public data network. Alternatively, the called party's telephony device could be an analog telephone that is coupled to a publically switched telephony network (PSTN). In still other instances, the called party's telephony device could be a cellular telephone or a mobile computing device with cellular telephone capabilities that is coupled to a cellular telephony network.

Typically, an IP telephony system receives a call setup request from the calling party's telephony device at an inbound proxy server (or a session border controller, or an originating gateway). The inbound proxy server consults a routing engine to determine the identity of an outbound proxy server (or session border controller or destination gateway) that is capable of communicating with the called telephony device. The inbound proxy server passes along the call setup request to the outbound proxy server. The outbound proxy server then contacts the called telephony device to attempt to setup the call.

During the call setup, the calling telephony device and the called telephony device are instructed where to send data packets bearing the media of the telephony communication so that those data packets can be delivered to the other telephony device. Often, a media relay is selected, and both the calling and called telephony devices are instructed to send data packets to the media relay, and to receive data packets from that media relay. In some instances, two or more media relays may be used in a chain fashion to create a path for the data packets to travel between the calling and called telephony devices.

Once the call has been setup, the called and calling telephony devices send data packets back and forth to each other using the path established during call setup. And this path typically no longer includes the inbound and outbound proxy servers. Instead, the path typically includes only one or more media relays that are used to help transmit the data packets between the calling and called telephony devices.

The complete path that the data packets traverse across the data network usually includes other devices in addition to the media relays that are identified during call setup. For example, when both the calling telephony device and the called telephony device are IP telephony devices, the calling and called telephony devices will likely use an interface device of some type to gain access to the data network. The interface device could be a wired or wireless router, or some other type of data network interface device. Regardless, the interface devices are also a part of the overall path that data packets traverse as they travel between the calling and called telephony devices.

If one of the calling and called telephony devices is an analog telephony device that is reachable through a PSTN, or a cellular telephony device that is reachable via a cellular telephony service provider, the path will likely include a gateway that acts as an interface between the data network and the PSTN or cellular telephony service provider.

If both the calling and called telephony devices are IP telephony devices, in some instances, the called and calling telephony devices may be instructed to send data packets directly back and forth between each other. In this instance, the path would not include a media relay. However, the path would still likely include the data network interface devices which the calling and called telephony devices use to access the data network.

In addition, when data packets are sent across a data network such as the Internet, the data packets typically make multiple separate hops between various nodes of the public Internet. As a result, two consecutive data packets generated by the calling telephony device could traverse vastly different paths as they make their way between the calling telephony device and the called telephony device.

The quality of a telephone call, or any other type of communication carried in this fashion, is highly dependent on how well the data packets carrying the media of the telephony communication are being transmitted over the relevant private and/or public data networks. If data packets are being lost, call quality will deteriorate. If transmitted data packets are being significantly delayed, call quality will deteriorate. Another problem is jitter, where the latency or delay is variable in nature. If jitter becomes a problem, call quality will again deteriorate.

Presently, IP telephony systems have only limited control over the path that data packets bearing the media of a telephony communication traverse as the data packets travel between a calling and called telephony device. Typically, the IP telephony can only determine the identity of the media relays that are used in the path.

When an IP telephony system has a choice about which media relay or relays to select for a particular telephony communication, the media relay or relays are often selected based on their physical proximity to the calling or called telephony devices, or based on their proximity to the proxy servers that were responsible for setting up the call. The assumption is that if the media relay(s) are physically close to the calling and/or called telephony devices, they will provide higher call quality than media relays that are located further away from the calling and/or called telephony devices. Unfortunately, this is not always a good assumption.

In some instances, an IP telephony system may attempt to track the quality provided by various paths between two endpoints. The quality measure that is recorded for each path is typically an average of multiple measures of the path's quality taken at multiple different points in time. While such measures can be helpful in identifying paths that offer superior quality, or paths that offer poor quality, these average quality measures fail to take into account the amount that the path's quality can vary over time.

For example, a quality measure for a path might be based on ten separate quality measurements taken at six minute intervals. When the ten quality measurements are averaged, they may yield a quality score that is good. However, the individual quality values might include five values that represent excellent quality and five values that represent poor quality. When averaged, they appear to indicate that the path provides good quality. In reality, the quality of the path experienced great variability over the one hour period.

When two parties are conducting a VOIP telephone call, the variability of the quality of the call can have a large impact on the user's experience. Even if the quality of a call varies between very good and average, frequent changes in the call quality are noticeable to the parties conducting the call, and are considered undesirable. In some instances, the user's perception of the quality of the call may be better if the call quality is consistently average, as opposed to varying frequently between average and very good.

Because of these factors, there is a need for systems and methods of tracking the variability in quality offered by different communication paths. There is also a need for systems and methods that take quality variation information into account when determining the path that is to be used for a communication.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
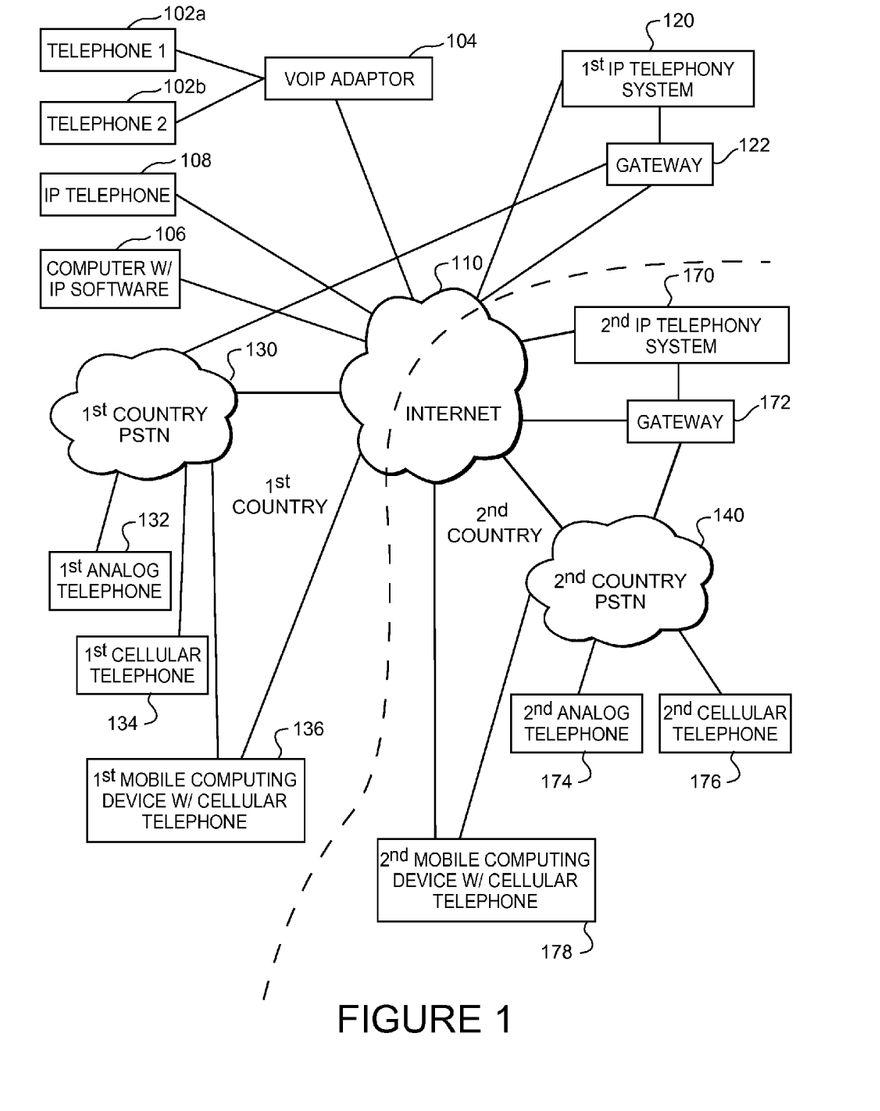
FIG. 1 is a diagram of a communications environment including various elements which are associated with an Internet protocol (IP) telephony system operating in accordance with the invention.

As illustrated in FIG. 1, a communications environment is provided to facilitate IP based communications. A first IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a first publicly switched telephone network (PSTN) 130 and a second PSTN 140 via one or more gateways 122.

The gateway 122 allows users and devices that are connected to the first and second PSTNs 130, 140 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a and 102b could all be coupled to the same telephone adaptor 104. Analog telephone devices include, but are not limited to, standard telephones and document imaging devices such as facsimile machines. A configuration using a telephone adapter 104 is common where all of the analog telephone devices 102a, 102b are located in a residence or business, and all of the telephone devices are connected to the same telephone adapter. With this configuration, all of the analog telephone devices 102a, 102b share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using the first analog telephone 132 which is connected to the first PSTN 130 may call a customer of the IP telephony system 120. In this instance, the call is initially connected from the first analog telephone 132 to the first PSTN 130, and then from the first PSTN 130, through the gateway 122 to the first IP telephony system 120. The first IP telephony system 120 then routes the call to the customer's IP telephony device. A third party using the first cellular telephone 134 could also place a call to an IP telephony system customer, and the connection would be established in a similar manner, although the first link would involve communications between the first cellular telephone 134 and a cellular telephone network. For purposes of this explanation, the cellular telephone network is considered part of the first PSTN 130.

In addition, mobile computing devices which include cellular telephone capabilities could also be used to place telephone calls to customers of the IP telephony system. The first mobile computing device 136, as illustrated in FIG. 1, might connect to the first PSTN 130 using its cellular telephone capabilities. However, such devices might also have the ability to connect wirelessly via some other means. For example, the mobile computing device 136 might communicate with a wireless data router to connect the first mobile computing device 136 directly to a data network, such as the Internet 110. In this instance, communications between the first mobile computing device 136 and other parties could be entirely carried by data communications which pass from the first mobile computing device 136 directly to a data network 110. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the first analog telephone 132 or first cellular telephone 134 that is routed through the first PSTN 130 to the first IP telephony system 120 via the gateway 122. This would typically be accomplished by the user calling a local telephone number that is routed to the first IP telephony system 120 via the gateway 122. Once connected to the first IP telephony system 120, the user may then place an outgoing long distance call to anywhere in the world using the first IP telephony system's network. Thus, the user is able place a long distance call using lower cost IP telephony service provided by the first IP telephony system 120, rather than a higher cost service provided by the first PSTN 130.

FIG. 1 also illustrates that a second IP telephony system 170 may interact with the first IP telephony system 120 via the Internet 110. For example, customers of the second IP telephony system 170 may place calls to customers of the first IP telephony system 120. In that instance, assets of the second IP telephony system 170 interact with assets of the first IP telephony system 120 to setup and carry the telephone call. Conversely, customers of the first IP telephony system 120 can place calls to customers of the second IP telephony system 170.

The second IP telephony system could also interact with customers of a second PSTN 140 via a gateway 172. The second PSTN 140 may be connected to a second analog telephone 174, a second cellular telephone 176 and a second mobile computing device 178.

In the following description, we will assume that the first IP telephony system 120, the first PSTN 130, the IP telephone 108, the VOIP adaptor 104, the first analog telephone 132, the first cellular telephone 134 and the first mobile computing device 136 are all located in a first country. Also, the second IP telephony system 170, the second PSTN 140, the second analog telephone 174, the second cellular telephone 176 and the second mobile computing device 178 are all located in a second country.

Figure 2:
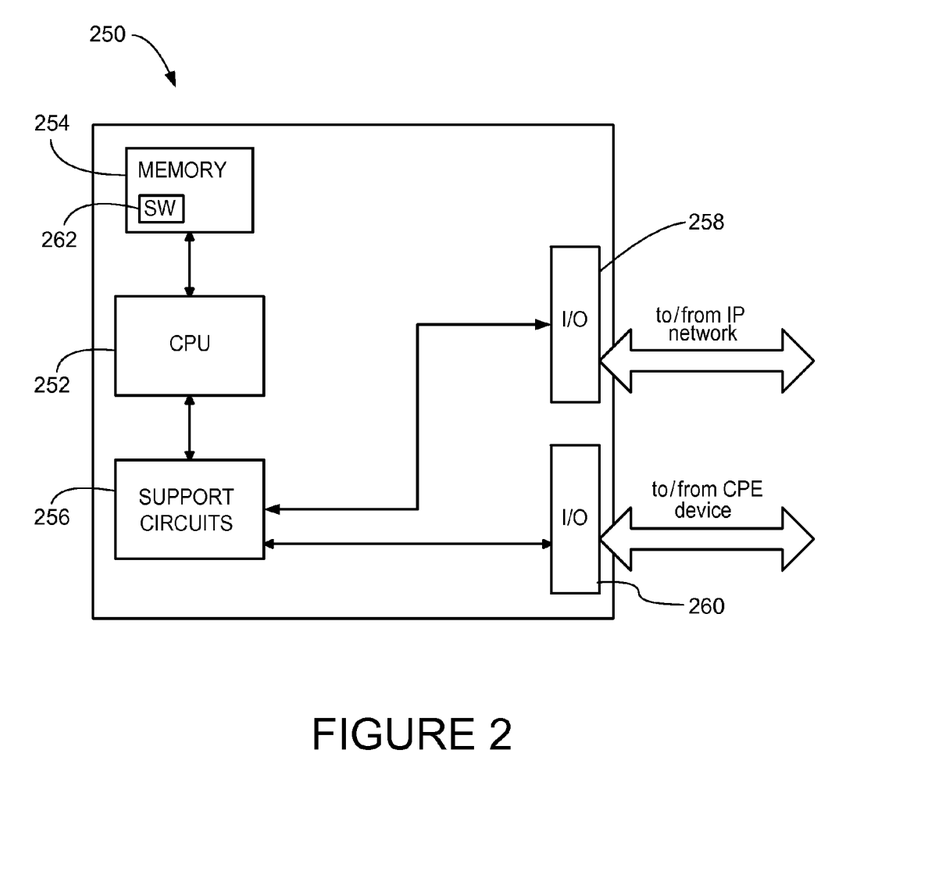
FIG. 2 is a diagram of various elements of a processor that forms part of an IP telephony system.

FIG. 2 illustrates elements of a computer processor 250 that can be used as part of the first or second IP telephony systems 120, 170 to accomplish various functions. Each of the IP telephony systems 120, 170 could include multiple processors 250 located at various locations in the system, along with their operating components and programming, each carrying out a specific or dedicated portion of the functions performed by the IP telephony systems 120, 170.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description will also refer to telephony communications and telephony activity. These terms are intended to encompass all types of telephone communications, regardless of whether all or a portion of the calls are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
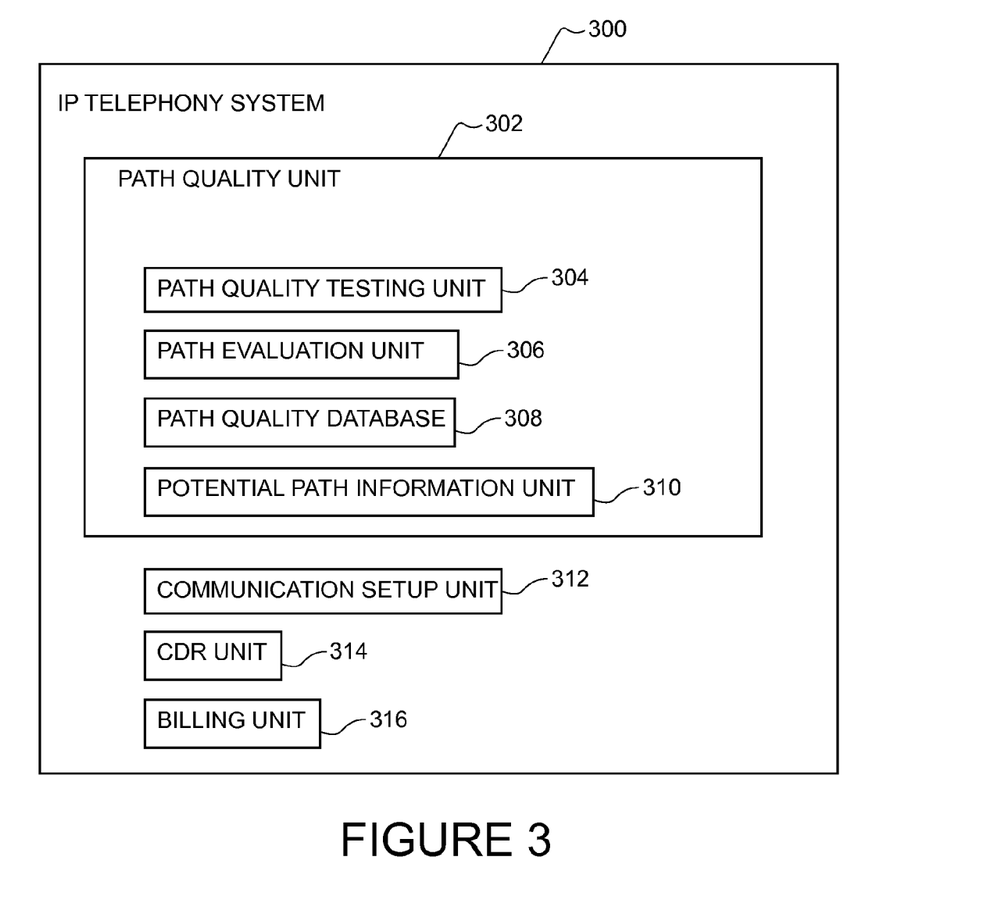
FIG. 3 is a diagram illustrating selected elements of an IP telephony system which includes a path quality unit that tests path quality and that calculates path quality values.

FIG. 3 illustrates selected elements of an IP telephony system 300 which performs various functions in accordance with the invention. The IP telephony system 300 includes a path quality unit 302 which tests the quality of various communications paths, and which calculates various quality measurements for the paths based on those measurements. The path quality unit 302 includes a path quality testing unit 304, a path evaluation unit 306, a path quality database 308 and a potential path information unit 310. A detailed description of how the elements of the path quality unit operate is provided below.

The IP telephony system 300 also includes a communication setup unit 312 that is responsible for assisting user telephony devices in setting up and conducting telephony communications. The IP telephony system 300 also includes a call detail record (CDR) unit 314 that records CDRs containing information about the communications that have been handled by the IP telephony system 300. A billing unit 316 uses information provided by the CDR unit 314 to bill customers for those communications.

Figure 4:
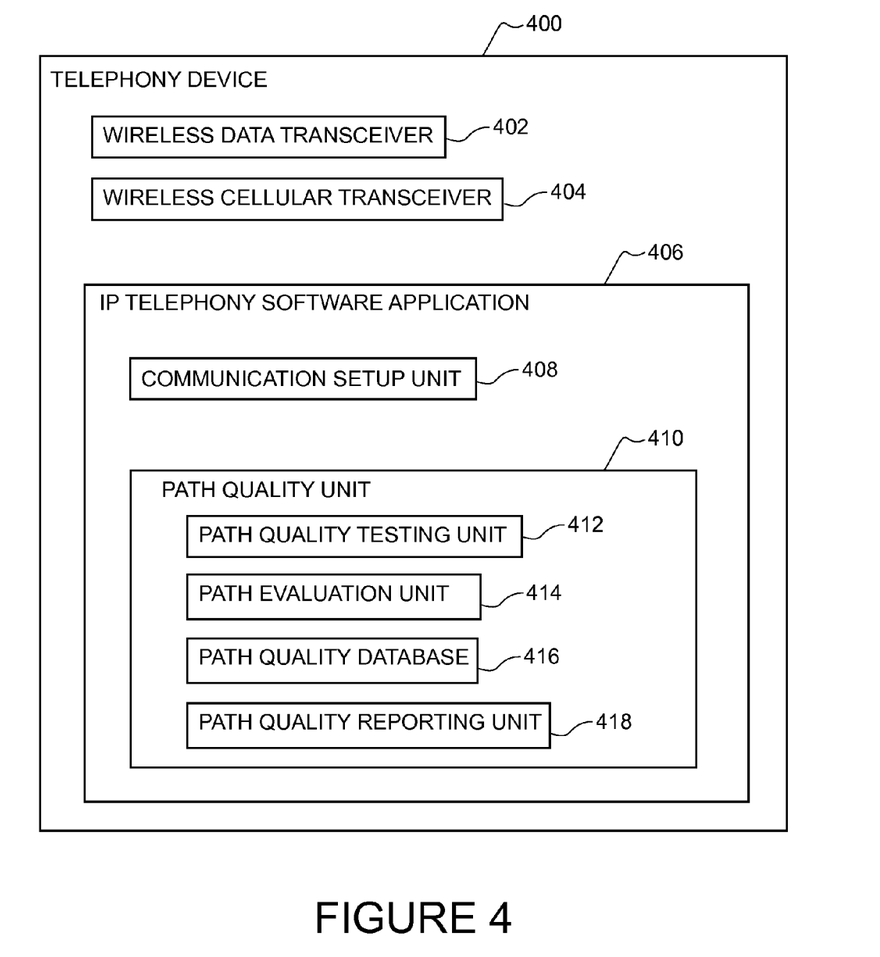
FIG. 4 is a block diagram illustrating elements of a telephony device that includes an IP telephony software application that tests path quality and that calculates path quality values.

FIG. 4 illustrates elements of a telephony device 400. The telephony device includes a wireless data transceiver 402 that can send and receive data packets bearing IP telephony communications. In some instances, the telephony device 400 may also include a wireless cellular transceiver 404 that can communicate with a cellular telephony system. The communications implemented through the cellular telephony system could include normal cellular telephone calls, as well as IP telephony communications that traverse a data path provided by the cellular telephony system.

The telephony device also includes an IP telephony software application 406 which is responsible for implementing IP telephony communications through an IP telephony system. A communication setup unit 408 communicates with a corresponding communication setup unit 312 of an IP telephony system to setup telephony communications through a data network. Once the communication is setup, media of the communication is exchanged with another telephony device via either the wireless data transceiver 402 or the wireless cellular transceiver 404 over a path selected for the communication.

The IP telephony software application 406 also includes a path quality unit 410. The path quality unit 410 is responsible for testing the quality of paths, and for calculating various quality values from collected test data. A path quality testing unit 412 conducts quality testing on selected paths. A path evaluation unit 414 evaluates the test results and calculates various quality values for the tested paths. A path quality database 416 can store raw test data, and/or the calculated quality values generated by the path evaluation unit 414. The path quality unit 410 also includes a path quality reporting unit 418 that reports test data and/or calculated quality values for paths to a path quality unit 302 of an IP telephony system. Details about how the elements of the path quality unit 410 operate are provided below.

As explained in the background section above, during call setup procedures, the calling telephony device and the called telephony device are informed of a communication path which can be used to transmit and receive data packets containing the media of the telephony communication. The called telephony device and the calling telephony device then route data packets bearing the media of the telephony communication through the identified communication path.

Figure 5:
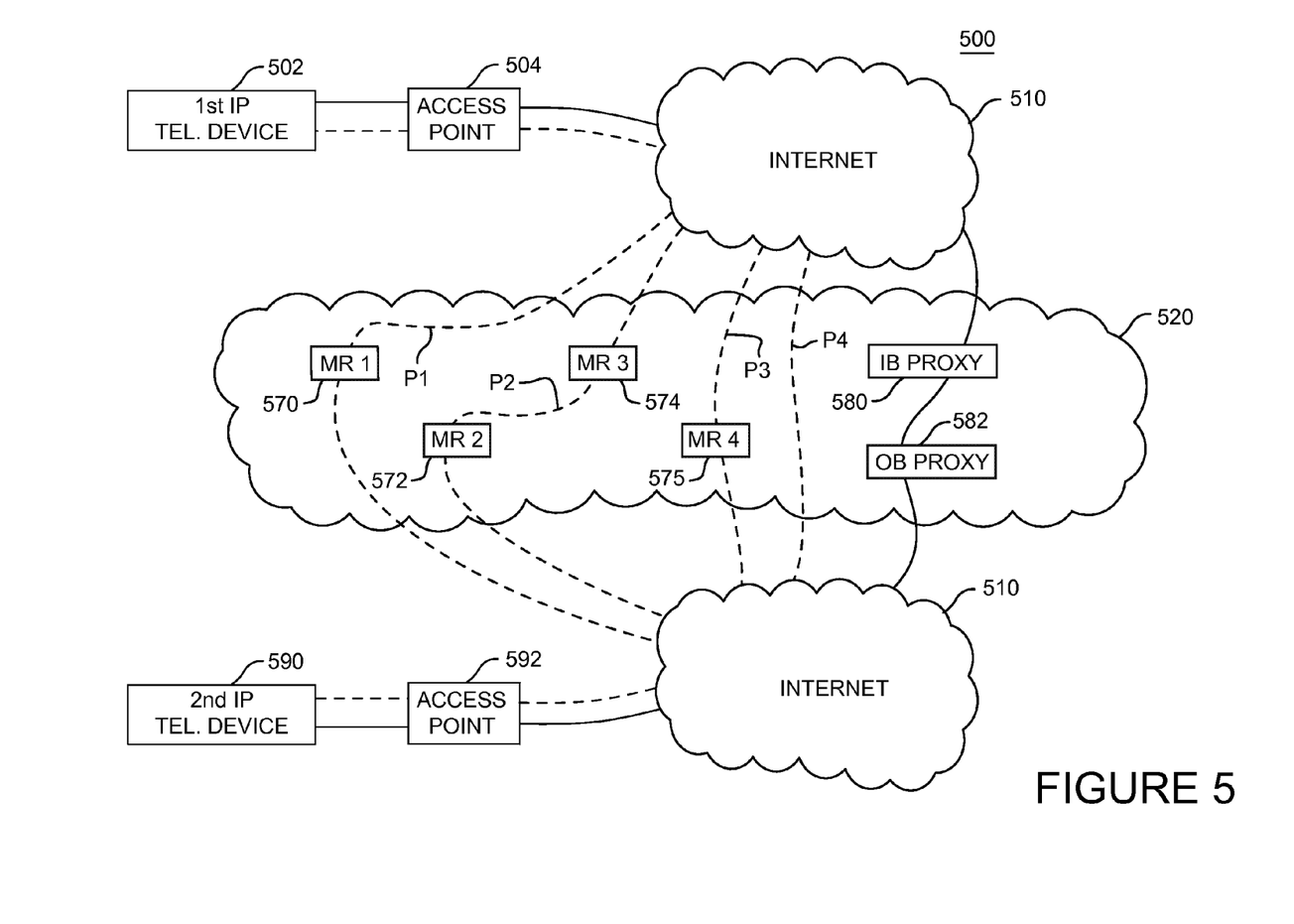
FIG. 5 is a diagram illustrating the different paths that the media of an IP telephony communication can take between two IP telephony devices.

FIG. 5 illustrates a communications environment 500 showing multiple paths that could be used to communicate data packets bearing the media of a telephony communication between a first IP telephony device 502 and a second IP telephony device 590. As shown in FIG. 5, the first IP telephony device 502 communicates with the Internet 510 over a first access point 504. Likewise, the second IP telephony device 590 communicates with the Internet 510 over a second access point 592. The first and second access points 504, 592 could be wired or wireless access points which provide the IP telephony devices with access to the Internet 510.

FIG. 5 also illustrates that an IP telephony system 520 includes an inbound proxy server 580 and an outbound proxy server 582. The IP telephony system 520 also includes multiple media relays. In the embodiment illustrated in FIG. 5, the IP telephony system 520 includes a first media relay 570, a second media relay 572, a third media relay 574 and fourth media relay 575. FIG. 5 illustrates that the media relays are part of the IP telephony system 520. However, in alternate embodiments, the media relays which form all or part of a communication path can be owned and controlled by third parties. Also, some communication paths could include one or more media relays which are part of an IP telephony system, as well as one or more media relays which are owned and/or controlled by a third party. Thus, the illustration of the media relays as being part of the IP telephony system 520 should in no way be considered limiting.

When the first IP telephony device 502 utilizes the IP telephony system 520 to set up and conduct a telephony communication, the first IP telephony device 502 could use any of the first, second, third and fourth media relays as part of a communication path that extends between the first IP telephony device 502 and the second IP telephony device 590. The path that is selected may depend on the quality of the individual paths.

The quality of a path refers generally to the ability of the path to transmit data packets quickly, in sequential order, and without losses. Traditional measures of quality include the rate at which data packets can be communicated along a path, the average time delay in getting data packets between two points, the number of packets that are lost, and jitter, which is a measure of the variability of the transmission delays which may be experienced by individual data packets. These measures and others may be combined in some fashion to provide an overall quality measure of a communications path.

The quality of a particular path may also be determined based, at least in part, on a calculated mean opinion score (MOS). Although a MOS can be calculated subjectively by human test personnel, software has also been developed to automatically calculate a MOS for telephony communications that pass over a path. The MOS may be calculated based on one or more of the measures of quality, such as those discussed above. The calculated MOS may be taken into account, along with other factors, to determine the overall quality offered by a path.

Also, a perceptual evaluation of speech quality (PESQ) score may be calculated for a path. Various standards and software exists to compute a PESQ score for a telephony communication passing along a path. The PESQ score for a path may be used along with the other measures described above to determine the overall quality of a particular path.

A call setup procedure where a user of the first IP telephony device 502 is attempting to place a call to the second IP telephony device 590 will now be described with reference to FIG. 5. The process begins when the first IP telephony device 502 sends a telephony communication setup request to an inbound proxy server 580 of the IP telephony system 520. The solid lines in FIG. 5 illustrate the path traversed by data packets bearing the setup signaling when the telephony communication is originally setup, and possibly also when the telephony communication is being terminated. The dashed lines in FIG. 5 illustrate the paths which are traversed by data packets bearing the media of a telephony communication.

When the inbound proxy server 580 receives the setup request from the first IP telephony device 502, it locates an outbound proxy server 582 which is capable of communicating with the second IP telephony device 590. The inbound proxy server 580 forwards the setup request to the outbound proxy server 582. The outbound proxy server 582 sends the setup request through the Internet 510 and the second access point 592 to the second IP telephony device 590. If the second IP telephony device 590 sends back signals indicating that it is willing to engage in the communication, a path for the media of the communication is selected. The inbound proxy server 580 informs the first IP telephony device 502 of the path that is to be used, and the outbound proxy server 582 informs the second IP telephony device 590 of the path that is to be used. The telephony communication then begins. Specifically, the second IP telephony device 590 generates a stream of data packets bearing the media of the telephony communication, and sends that stream of data packets to the first IP telephony device 502 via the selected path. Likewise, the first IP telephony device 502 generates a stream of data packets bearing the media of the telephony communication and sends the stream to the second IP telephony device 590 via the selected path.

In the embodiment illustrated in FIG. 5, there are four available paths. The first path P1 traverses the first media relay 570. The second path P2 traverses the second media relay 572 and the third media relay 574. The third path P3 traverses the fourth media relay 575. The fourth path P4 involves the first IP telephony device 502 exchanging data packets directly with the second IP telephony device 590 without passing through a media relay.

As noted above, the path that is selected for the communication can be based on the quality offered by each of the respective paths. And the quality measures can include both a measure of the average call quality that is likely to be offered by a path during a particular time period, and a measure of how much the quality of that path is expected to vary over a particular time period. These forms of quality information can be calculated and recorded using methods as described below. When the call is being setup, previously recorded path quality information is used, along with other information, to choose a path for the communication.

Various other forms of information about the paths will likely also play a role in determining the path that is selected for the communication. For example, the cost of using each path will likely also be taken into account.

Also, the IP telephony system may have recorded historical information about past communications between the same two parties. For example, the IP telephony system may know that the two parties to the new communication tend to have lengthy communications, or that they tend to have brief communications. If the call quality information for a path indicates that there will likely be significant variability in the quality over an extended period of time, then that path would be a poor choice for a call that is expected to last for a long time. On the other hand, if a call is likely to be brief, an anticipated variability in quality may not matter, and the path might be acceptable.

Information about the capabilities of the first IP telephony device 502 and the second IP telephony device 590 may also influence the path that is selected. If a path is capable of delivering adequate quality when a particular CODEC is used, and both IP telephony devices are capable of using that CODEC, then the path could be selected for use. If either of the IP telephony devices is incapable of using that CODEC, then the path would be a poor choice.

The time of day and the day of the week that the communication is being setup may also influence the path selection. The quality information for each path may provide different quality values for different time periods in each day and for different days of each week. This can include different average quality values for each of those time periods, and also different measures of how much the quality is expected to vary during each of the time periods. Thus, the time of the day and the day of the week that the communication is being setup may also influence the selection of the path.

Other external factors may also influence the path selection. For example, if one can anticipate many people in a particular geographical location using a large portion of the available bandwidth during a certain period of time, this could influence the path that is selected. For example, if one knows that a very popular television show which is accessible via the Internet will be broadcast during a particular time, one could anticipate that a significant portion of the available bandwidth in locations where people view the program will be used by viewers, and unavailable for carrying telephony communications. This knowledge could influence the selection of a particular path.

Figure 6:
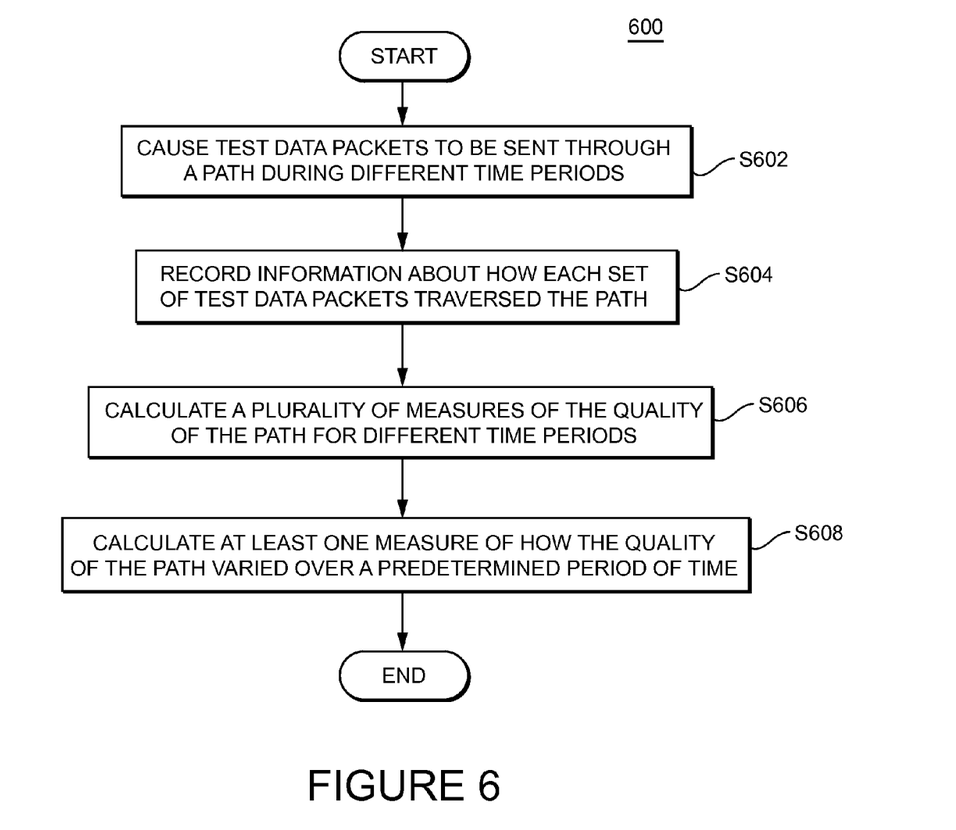
FIG. 6 is a flow chart illustrating steps of a method of testing path quality and calculating various path quality values.

FIG. 6 illustrates steps of a method 600 of developing quality information for an individual path. This method could be performed by elements of an IP telephony system 300 as illustrated in FIG. 3, or by elements of a telephony device 400 as illustrated in FIG. 4.

The method begins in step S602, where test data packets are sent through a particular path during different time periods. This step could be implemented by the path quality testing unit 304 of an IP telephony system 300 itself sending such data packets through the path at different times. Alternatively, the path quality testing unit 304 of an IP telephony system 300 could instruct one or more telephony devices to send data packets through the path.

In step S604, information about how well each set of test data packets traversed the path is recorded. This information could be captured by the path quality testing unit 304 of the IP telephony system 300, or by the path quality testing unit 412 of an IP telephony software application 410 on a telephony device 400. This information may also initially be captured by some other network element, which then reports this information to the path quality testing unit 304 of the IP telephony system 300 or the path quality testing unit 412 of an IP telephony software application 406 on a telephony device 400.

In step S606, the path evaluation unit 306 of the IP telephony system 300 or the path evaluation unit 414 of an IP telephony software application 406 of a telephony device 400 uses the recorded information to calculate various quality measures for the path. Information on how well different sets of test packets traversed the path during different times is used to calculate quality measures for the path during those times. This information is recorded in a path quality database 308 of the IP telephony system 300, and/or in a path quality database 416 on a telephony device 400.

As noted above, there are various different methods for measuring the quality of a path and for calculating a quality value. Most of these methods use data packet delivery statistics as the input for calculating a value indicative of the quality of a path. In some embodiments, only a single quality value may be recorded for a path for a given point in time or for a given time period. In other embodiments, multiple different types of quality values may be calculated for a path at a given point in time or for a time period, and those different quality values may be combined in some fashion to arrive at an overall value indicative of the quality of the path at the given point in time or for a given time period.

In step S608, the path evaluation unit also determines how much the quality of the path varied over a given time period. Alternatively, or in addition, the path evaluation unit may calculate how much the quality of a path varied from one point in time to the next, or from a first time period to a second time period. The quality values that were calculated in step S606 may be used as the input for these calculations. Alternatively, the raw data about how well test data packets traversed the path at different times may be used as the input for these calculations.

The variability of the quality of a path can be quantified in different ways. In some embodiments, the variability of the quality could be a measure of standard deviation from an average quality value. In other embodiments, variability could be a measure of how often and to what extent a quality measure dipped below a threshold. Further, the variability could be expressed as a single value which is determined by combining multiple different types of variability measures.

The quality of an individual path can vary considerably during different times of the day or from one day to the next. In addition, the day of the month can also influence the quality of a path. Moreover, the quality of a path might also vary upon the occurrence of a particular holiday. All of these factors can influence the amount of traffic that exists on a particular path at a particular point in time, and thus have an impact on quality. For this reason, quality information is developed for paths at different time periods during the day, and for different days. Over time, an overall picture of the quality of a path will emerge. However, it may be necessary to track the quality of a path for an extended period of time before one will be able to predict the quality of a path with accuracy. By tracking quality values over an extended period of time, one can ultimately begin to appreciate when, and under what conditions, the quality of a path is likely to change.

Figure 7:
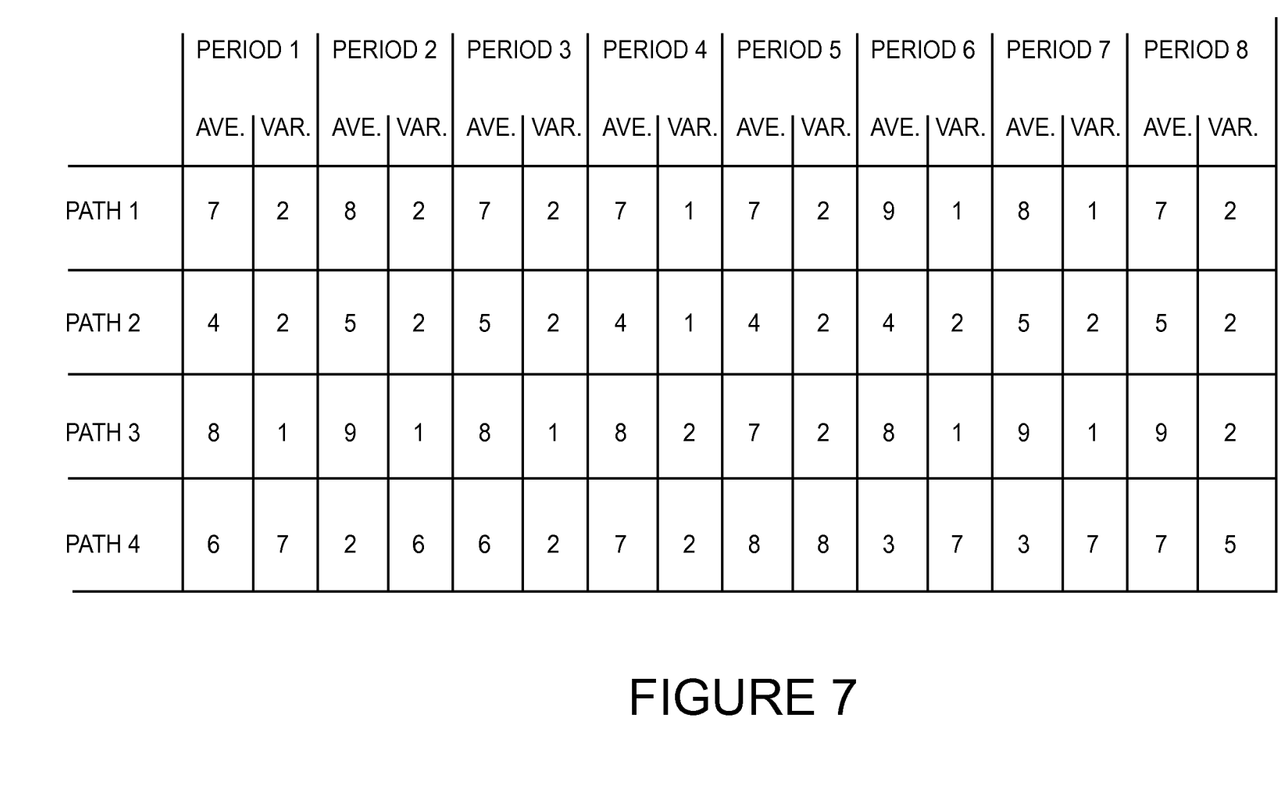
FIG. 7 is diagram illustrating a structure of a database for storing path quality information.

The quality values calculated in step S606 and the quality variability measures which are calculated in step S608 are then stored in a path quality database 308 of the path quality unit 302 of the IP telephony system 300, or in a path quality database 416 on a telephony device 400. FIG. 7 illustrates one embodiment of how such a database could be configured.

The path quality database lists two quality values for each path for each of a plurality of different time periods. The first quality value represents an average quality of the path during the relevant time period. The second quality value represents how much the quality of the path varied during the relevant time period. Both values are normalized to a scale of 1 to 10. Thus, an average quality value of 10 is considered excellent quality, and an average quality value of 1 is considered very poor. A quality variability value of 1 means there was very little variation in the quality of a path during the relevant time period, whereas a quality variability value of 10 means there was great variability in the quality of the path during the relevant time period.

The values appearing in FIG. 7 indicate that Path 1 had good to excellent quality during all the time periods, and that variability in the quality was quite low for all time periods. In contrast, Path 4 had very different average quality in different time periods, ranging from very good in time periods 4, 5 and 8, to very poor in time periods 2, 6 and 7. The quality variation on Path 4 was also quite different in different time periods, but was generally quite high in most time periods, indicating that Path 4 is rather unstable and unpredictable.

The path quality database structure illustrated in FIG. 7 is merely exemplary. The path quality database could be organized in many other fashions, and could include many additional data fields that store other and additional quality measures. However, the basic concept is to track at least one measure of the overall quality of each path at different points in time or for different time periods, and to also track a measure of the variability of each path at different points in time or over different time periods.

The method described in connection with FIG. 6 illustrates one way in which data can be acquired to populate the data fields of a path quality database. The method involves sending test data packets over individual paths to test for quality. However, in alternate embodiments, data packet delivery statistics could be gathered by noting how well data packets carrying actual IP telephony communications traverse the paths. Such alternate methods would not require that test data packets be sent. Instead, a path quality testing unit of an IP telephony system or a telephony device would simply monitor the delivery of data packets which are generated and sent during the transmission of normal communications.

If path quality testing and evaluation is performed by a path quality unit 406 of a telephony device, the results of the testing and/or quality values that are calculated from test results are reported by a path quality reporting unit 418 to the path quality unit 302 of an IP telephony system 300. This allows the test results to be stored in a central path quality database 308 maintained by the IP telephony system 300. Such results can then be made available to all other telephony devices. Also, elements of the IP telephony system 300 can then use this information to select paths for telephony communications.

FIG. 5 illustrates various paths that can be used to communicate data packets bearing the media of a telephony communication between a first IP telephony device 502 and a second IP telephony device 590. However, the overall paths illustrated in FIG. 5 could be broken down into smaller paths. And quality testing as described above could be conducted on the smaller paths.

For example, test data packets could be sent from the first IP telephony device 502 to the first media relay 570 to test the quality of the path between these two elements. Likewise, the second IP telephony device 590 could send test data packets to the first media relay 570 to test the quality of the path between those two elements. This type of testing would evaluate different portions of the larger path P1. Similarly, test data packets could be sent between the second media relay 572 and the third media relay 574 to test the quality of the path between those two elements. This would test a portion of the second path P2. The systems and methods described herein apply to both the complete path that may exist between two telephony devices, as well as to smaller paths between any two logical elements.

Figure 8:
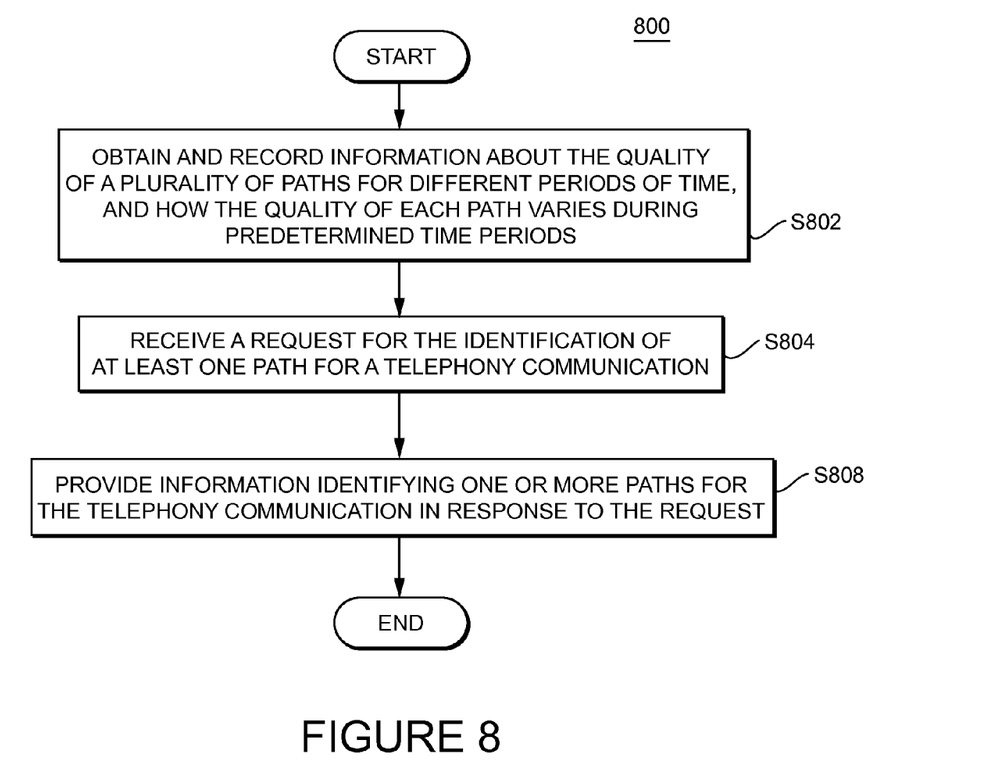
FIG. 8 is a flowchart illustrating steps of a method of recording path quality information and using that path quality information to recommend potential paths for the media of an IP telephony communication.

Once call quality information has been developed for various different paths, or path segments, as described above, this information is used to help route new IP telephony communications. FIG. 8 illustrates steps of a method of developing test data and using it to help route new IP telephony communications.

The method 800 begins and proceeds to step S802, where information about the quality of various different paths during various different time periods is obtained and recorded. The methods described above can be used to obtain and record such information.

In step S804, a path quality unit of an IP telephony system 300 receives a request for the identification of at least one path for a new telephony communication. This request would likely be received when a communication setup unit 408 of a telephony device 400 is attempting to setup a new IP telephony communication with the assistance of a communication setup unit 312 of the IP telephony system. Thus, the request could be received from the communication setup unit 408 on the telephony device 400 or from the communication setup unit 312 of the IP telephony system.

In step S806, the potential path information unit 310 of the path quality unit 302 of the IP telephony system 300 consults the path quality database 308, and possibly some other sources of information, to determine one or more paths that would be suitable for the communication. The potential path information unit 310 then provides information about the suitable paths to the requesting entity so that the communication can be established through a suitable path.

As explained above, the selection of a path could be based on a variety of factors, two of which are the overall quality offered by the path and the anticipated quality variability of the path. However, many other factors such as the cost of using a path, the anticipated length of the communication, the capabilities of the telephony devices involved in the communication and other factors many also be taken into account in identifying one or more paths as suitable for the communication. Over time, by analyzing the data collected in the path quality database, the IP telephony system can learn the factors that impact the quality of a path, and use this information to predict the path quality with higher and higher degrees of accuracy.

The information about suitable paths for the communication may include the identification of only a single path. Alternatively, the information may identify multiple paths which are suitable for the communication. When information on multiple paths is provided, the information may indicate which of the paths are considered the best. For example, the information may be in the form of a ranked list of paths, with the best path listed first and the worst path listed last.

In many of the foregoing descriptions, a software application running on a telephony device performs various functions. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

In the embodiments discussed above, a first IP telephony device is seeking to setup a telephony communication with a second IP telephony device. However, the systems and methods described above are equally applicable to situations where a first IP telephony device is attempting to setup a telephony communication with an analog or cellular telephone. In those instances, the first IP telephony device would be sending data packets bearing the media of the telephony communication to a gateway or another similar device which acts as an interface between an IP telephony system and the PSTN or a cellular network. However, the media relays discussed above could still be used to communicate data packets bearing the media of the telephony communication between the interface gateway and the first IP telephony device. Thus, most of the methods described above could also be used to facilitate the selection and use of particular communication paths in this situation.

Although the above discussion related to selecting a path for telephony communications, the same basic techniques could be applied in other context to select a path. For example, the same basic techniques could be used to select a path to route a traveler as the traveler moves from a first location to a second location. Thus, the techniques discussed above might be applied to navigation systems used to route vehicle drivers to particular locations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of providing one or more preferred paths for transmission of digital data packets bearing the media of an Internet protocol (IP) telephony communication, comprising:

obtaining, with at least one processor, information about the respective quality of each of a plurality of paths that can be used to communicate data packets bearing IP telephony communications, wherein the obtained information includes, for each of the plurality of paths, a first quality measure that is indicative of the average quality provided by the path over a predetermined period of time in the past, and a second quality measure that is indicative of how much the quality of the path varied over that same predetermined period of time;

receiving a request for an identification of at least one path that can be used for an IP telephony communication; and identifying, with at least one processor, at least one path for the IP telephony communication based on the obtained information.

2. The method of claim 1, wherein the obtained information also includes, for each of the plurality of paths, a quality measure that is indicative of an anticipated quality for each path.

3. The method of claim 1, further comprising obtaining information about an anticipated duration for the telephony communication, and wherein the identifying step comprises identifying at least one path based on the anticipated duration of the telephony communication.

4. The method of claim 1, wherein the receiving step comprises receiving the request from a telephony device and wherein the method further comprises sending a communication to the telephony device that informs the telephony device of the identified at least one path for the telephony communication.

5. The method of claim 1, wherein the identifying step comprises identifying a plurality of paths.

6. The method of claim 5, wherein the identifying step comprises identifying the plurality of paths in a ranked order, the order being indicative of the relative suitability of the paths for the telephony communication.

7. A system for providing one or more preferred paths for transmission of digital data packets bearing the media of an Internet protocol (IP) telephony communication, comprising:

means for obtaining, with at least one processor, information about the respective quality of each of a plurality of paths that can be used to communicate data packets bearing IP telephony communications, wherein the obtained information includes, for each of the plurality of paths, a first quality measure that is indicative of the average quality provided by the path over a predetermined period of time in the past, and a second quality measure that is indicative of how much the quality of the path varied over that same predetermined period of time;

means for receiving a request for an identification of at least one path that can be used for an IP telephony communication; and means for identifying, with at least one processor, at least one path for the IP telephony communication based on the obtained information.

8. A system for providing one or more preferred paths for transmission of digital data packets bearing the media of an Internet protocol (IP) telephony communication, comprising:

a path quality unit comprising at least one processor that obtains information about the respective quality of each of a plurality of paths that can be used to communicate data packets bearing IP telephony communications, wherein the obtained information includes, for each of the plurality of paths, a first quality measure that is indicative of the average quality provided by the path over a predetermined period of time in the past, and a second quality measure that is indicative of how much the quality of the path varied over that same predetermined period of time; and a potential path information unit comprising at least one processor that receives a request for an identification of at least one path that can be used for an IP telephony communication, and that identifies at least one path for the IP telephony communication based on the obtained information.

9. The system of claim 8, wherein the obtained information also includes, for each of the plurality of paths, a measure indicative of an anticipated quality for each path.

10. The system of claim 8, wherein the path quality unit also obtains information about an anticipated duration for the telephony communication, and wherein the potential path information unit identifies at least one path based on the anticipated duration of the telephony communication.

11. The system of claim 8, wherein the potential path information unit receives the request from a telephony device and wherein the potential path information unit sends a communication to the telephony device that informs the telephony device of the identified at least one path for the telephony communication.

12. The system of claim 8, wherein the potential path information unit identifies a plurality of paths.

13. The system of claim 12, wherein the potential path information unit identifies the plurality of paths in a ranked order, the order being indicative of the relative suitability of the paths for the telephony communication.

* * * * *